US009701855B2

(12) United States Patent
Tanaka et al.

(10) Patent No.: US 9,701,855 B2
(45) Date of Patent: Jul. 11, 2017

(54) PRINTING INK VARNISH, AND PRINTING INK COMPOSITION USING SAME

(71) Applicants: TOYO INK SC HOLDINGS CO., LTD., Chuo-ku (JP); TOYO INK CO., LTD., Chuo-ku (JP)

(72) Inventors: Satotaro Tanaka, Tokyo (JP); Harunori Narihiro, Tokyo (JP); Nobutaka Takenaka, Tokyo (JP); Yuika Hayasaka, Tokyo (JP)

(73) Assignees: TOYO INK SC HOLDINGS CO., LTD., Chuo-ku (JP); TOYO INK CO., LTD., Chuo-ku (JP)

( * ) Notice: Subject to any disclaimer, the term of this patent is extended or adjusted under 35 U.S.C. 154(b) by 0 days.

(21) Appl. No.: 14/760,399

(22) PCT Filed: Jan. 10, 2014

(86) PCT No.: PCT/JP2014/050329
§ 371 (c)(1),
(2) Date: Jul. 10, 2015

(87) PCT Pub. No.: WO2014/109386
PCT Pub. Date: Jul. 17, 2014

(65) Prior Publication Data
US 2015/0353746 A1 Dec. 10, 2015

(30) Foreign Application Priority Data
Jan. 11, 2013 (JP) .................................. 2013-003561

(51) Int. Cl.
C09D 11/102 (2014.01)
C08G 18/66 (2006.01)
C08G 18/75 (2006.01)
C08G 18/12 (2006.01)
C09D 175/12 (2006.01)
C09D 11/033 (2014.01)
C08G 18/48 (2006.01)
C08G 18/40 (2006.01)
C08G 18/42 (2006.01)

(52) U.S. Cl.
CPC ............ C09D 11/102 (2013.01); C08G 18/12 (2013.01); C08G 18/4018 (2013.01); C08G 18/4202 (2013.01); C08G 18/4238 (2013.01); C08G 18/4808 (2013.01); C08G 18/4825 (2013.01); C08G 18/6607 (2013.01); C08G 18/755 (2013.01); C09D 11/033 (2013.01); C09D 175/12 (2013.01); Y10T 428/24802 (2015.01)

(58) Field of Classification Search
CPC .. C09D 11/00; C09D 11/30; Y10T 428/24802
See application file for complete search history.

(56) References Cited

U.S. PATENT DOCUMENTS

| 5,545,678 A * | 8/1996 | Giencke | C08F 2/28 523/404 |
| 6,034,154 A * | 3/2000 | Kase | C08G 18/0823 260/DIG. 38 |
| 7,067,607 B2 * | 6/2006 | Eugene | C08G 18/12 106/31.13 |
| 7,368,487 B2 * | 5/2008 | Wu | C09D 11/30 523/160 |
| 2010/0093926 A1 * | 4/2010 | Richards | C08G 18/10 524/590 |
| 2010/0330375 A1 * | 12/2010 | Pajerski | C08F 283/006 428/425.1 |
| 2011/0021675 A1 | 1/2011 | Shigemori et al. | |
| 2012/0219769 A1 * | 8/2012 | Nagahama | C09D 11/32 428/195.1 |

FOREIGN PATENT DOCUMENTS

| JP | 56 166275 | 12/1981 |
| JP | 61 095018 | 5/1986 |
| JP | 62 153367 | 7/1987 |
| JP | 63 317562 | 12/1988 |
| JP | 2000 080139 | 3/2000 |
| JP | 2003 206431 | 7/2003 |
| JP | 2003206431 A * | 7/2003 |
| JP | 3972373 | 9/2007 |

(Continued)

OTHER PUBLICATIONS

Original and Machine Translation of JP 2003-206431.*
Office Action issued Oct. 30, 2015 in Korean Patent Application No. 10-2015-7018949 (with English language translation).
International Search Report Issued Mar. 18, 2014 in PCT/JP2014/050329 Filed Jan. 10, 2014.
International Preliminary Report on Patentability and Written Opinion issued Jul. 23, 2015 in PCT/JP2014/050329 (submitting English translation only).

(Continued)

Primary Examiner — Bruce H Hess
Assistant Examiner — Sathavaram I Reddy
(74) Attorney, Agent, or Firm — Oblon, McClelland, Maier & Neustadt, L.L.P.

(57) ABSTRACT

The present invention relates to an oil-based printing ink varnish comprising a polyurethane prepared using a polymeric polyol and a polyisocyanate as the main structural components, wherein the polyurethane is synthesized using, as a chain extender, a polyfunctional amine which contains at least one secondary amino group in each molecule and in which the total of the number of primary amino groups and the number of secondary amino groups is 3 or more per molecule. The present invention is able to provide a printing ink varnish containing a non-aromatic organic solvent and having excellent laminate strength, blocking resistance, dot reproducibility and plate clogging resistance, as well as a laminate ink containing the varnish.

5 Claims, No Drawings

(56) References Cited

FOREIGN PATENT DOCUMENTS

| JP | 2008 013725 | 1/2008 | | |
|----|----|----|----|----|
| JP | 2009 255063 | 11/2009 | | |
| JP | 2010 053194 | 3/2010 | | |
| JP | 2010 189514 | 9/2010 | | |
| JP | 2011 144354 | 7/2011 | | |
| JP | WO 2011148709 A1 * | 12/2011 | ............. | C09D 11/32 |

OTHER PUBLICATIONS

Combined Chinese Office Action and Search Report issued on Jun. 12, 2016 in Patent Application No. 201480004135.3 (with English language translation).

Office Action issued Feb. 4, 2016, in corresponding Chinese Patent Application No. 2014800041353 (with English-language Translation).

Office Action issued Jan. 23, 2014, in corresponding Japanese Patent Application No. 2013-003561 (with English-language Translation).

Office Action issued Oct. 31, 2013, in corresponding Japanese Patent Application No. 2013-003561 (with English-language Translation).

* cited by examiner

PRINTING INK VARNISH, AND PRINTING INK COMPOSITION USING SAME

TECHNICAL FIELD

The present invention relates to a printing ink varnish containing a non-aromatic organic solvent and having excellent laminate strength, blocking resistance, dot reproducibility and plate clogging resistance.

BACKGROUND ART

Gravure printing and flexographic printing are widely used for the purposes of imparting superior esthetics and functionality to printed items, but in recent years, as a result of the increasing diversity in packages and improved packaging techniques, together with the need to deal with environmental issues from a legal and regulatory perspective, the performance levels required from printing inks become more and more diverse every year. In particular, as a result of the Air Pollution Control Act that came into effect several years ago, the removal of toluene from inks has progressed rapidly, and the maintenance of performance levels in systems from which toluene has been eliminated is a significant challenge, with the entire industry striving to improve printability and printing effects.

Against this background, and for reasons including reducing the amount of residual solvent, improving the suitability for extrusion lamination, and enhancing the solubility in toluene-free solvents composed mainly of ester solvents and/or alcohol solvents, improved polyurethane resins continue to be developed as the binders for all manner of inks, and especially for inks for lamination. The polyurethane used in a typical laminate ink represents 40 to 80% of the ink film, and therefore the selection of the polyester polyol, polyether polyol and diisocyanate used as the polyurethane raw materials and the polyamine used as the chain extender, and the setting of the ratio between these components, have a significant effect on the performance of the printing ink, including the physical properties of the ink film and the printability.

Further, inks for lamination naturally require superior coating film properties such as good laminate strength and adhesion to various printing substrates such as OPP and PET films and synthetic papers, and superior blocking resistance, but also require good printability. A first problem which must be overcome to achieve good printability is the problem of dot reproducibility, which is a phenomenon that occurs when a colored ink is first printed onto a printing substrate, and particularly a film, and a white ink is then overprinted on top of the colored ink, with the problem occurring when the dot of the colored ink is dissolved by the solvent of the white ink. A second problem is the problem of plate clogging, which is a phenomenon that occurs during long print runs when the cells of the gravure cylinder become blocked with insoluble matter, making it impossible to transfer the ink to the printing substrate, particularly in highlight regions.

JP 2010-53194 A (Binder for printing ink, printing ink composition using the same binder, as well as covering material using the same printing ink) describes a combination of favorable coating film properties and printability, but in this document, only plate fogging is mentioned in relation to printability, and the plate clogging resistance and dot reproducibility of the ink can certainly not be claimed to be favorable. Further, although synthesis examples have been reported (JP 2011-144354 A, JP 3,972,373 B) in which, during the step of using an amine as a chain extender in the urethane synthesis, a trifunctional or higher polyamine is selected as the polyfunctional amine used for effecting a chain extension in an aqueous emulsion polymerization system, and the polyfunctional amine is incorporated within a micellized prepolymer in the water, and undergoes polymerization inside the micelles to form an aqueous emulsion resin binder, obtaining a solution-based resin binder that is of practical use as a printing ink binder by using a trifunctional or higher polyamine in a homogenous polymerization system in an organic solvent has proven very difficult.

PRIOR ART DOCUMENTS

Patent Documents

Patent Document 1: JP 2010-53194 A
Patent Document 2: JP 2011-144354 A
Patent Document 3: JP 3,972,373 B

SUMMARY OF THE INVENTION

Problems to be Solved by the Invention

The present invention has an object of providing a printing ink varnish containing a non-aromatic organic solvent and having not only good laminate strength and blocking resistance, but also superior dot reproducibility and plate clogging resistance in conventional oil-based gravure inks and binder resins, as well as providing a printing ink composition comprising the varnish.

Means to Solve the Problems

As a result of intensive research aimed at achieving the above object, the inventors of the present invention discovered that they were able to completely resolve the problems described above, and based on these findings, were able to complete the present invention.

In other words, the present invention relates to an oil-based printing ink varnish comprising a polyurethane prepared using a polymeric polyol and a polyisocyanate as the main structural components, wherein the polyurethane is synthesized using, as a chain extender, a polyfunctional amine which contains at least one secondary amino group in each molecule and in which the total of the number of primary amino groups and the number of secondary amino groups is 3 or more per molecule.

Further, the present invention also relates to a printing ink composition comprising the printing ink varnish described above.

Furthermore, the present invention also relates to a printed item obtained by applying the printing ink composition described above to a printing substrate.

Moreover, the present invention also relates to a laminate formed by laminating a sealant to at least one surface of the printed item described above.

Effects of the Invention

In the synthesis of a polyurethane in an organic solvent according to the present invention, in which a chain extension is performed by reacting a urethane polymer, obtained by reacting a polymeric polyol and a polyisocyanate, with an amine that has been dissolved uniformly in the organic solvent, if the resin that is synthesized by using, as the chain extender, a polyfunctional amine which contains at least one secondary amino group in each molecule and in which the total of the number of primary amino groups and the number of secondary amino groups is 3 or more per molecule, is used in a printing ink, then excellent levels of PET laminate strength, blocking resistance, dot reproducibility and plate clogging resistance are able to be achieved.

EMBODIMENTS FOR CARRYING OUT THE INVENTION

Embodiments of the present invention are described below in detail, but the constituent elements detailed below are merely examples (representative examples) of embodiments of the present invention, and the present invention is not limited by the content of these embodiments, with various modifications being possible within the scope of the invention.

The present invention relates to a printing ink varnish comprising a polyurethane resin (D), obtained by reacting a urethane prepolymer, which has isocyanate groups at the terminals and is obtained by reacting a polymeric polyol (A) and a polyisocyanate (B), with a polyamine (C), and also comprising a non-aromatic organic solvent, wherein the polyamine (C) comprises a polyfunctional amine (C1) which contains at least one secondary amino group in each molecule and in which the total of the number of primary amino groups and the number of secondary amino groups is 3 or more per molecule.

A feature of the present invention is the ability to obtain a uniform polyurethane resin solution in a homogenous polymerization system within an organic solvent by using, as a chain extender, the polyfunctional amine (C1) which contains at least one secondary amino group in each molecule and in which the total of the number of primary amino groups and the number of secondary amino groups is 3 or more per molecule. In the nucleophilic addition reaction between the isocyanate and the amine, by utilizing the difference in nucleophilicity between a primary amino group and a secondary amino group, localized reaction can be avoided, and a uniform solution-based resin with no gelling can be obtained. Further, because the primary structure of the urethane resin adopts a branched structure and becomes bulky, the actual molecular weight is smaller than the apparent molecular weight, and the structure can maintain a stably dissolved state in solution form. Furthermore, the chain extension is generally performed by introducing an excess of amino groups relative to the number of isocyanate residues of the prepolymer, and therefore although the majority of the secondary amino groups react with isocyanate residues, because of the difference in reactivity, a polymer is obtained which has a portion of the secondary amino groups, equivalent to the amine excess, within the polymer main chain. With such a polymer, it is thought that the secondary amino groups in the main chain of the polymer adsorb to the pigment surface, so that the polymer adopts a structure in which the main chain exists in linear form on the pigment surface, the branch chains extend out into the solution, and the side chains exhibit a steric hindrance effect, thereby facilitating stability of the pigment dispersion. Consequently, despite being toluene-free and MEK-free, a polyurethane resin composition for a printing ink obtained using the method described above is able to achieve the type of favorable plate clogging resistance that has conventionally been unattainable. Moreover, because the polymer adopts a branched structure, the polymer chains interact strongly in a solid phase state, making it difficult for the polymer to adopt a swollen state from the solid phase state, and therefore the dot reproducibility can be improved dramatically.

The polyfunctional amine (C1) of the present invention is a trifunctional amine represented by general formula (1) shown below.

General formula (1)

[Chemical Formula 1]

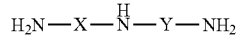

In the formula, X and Y represent divalent groups that are an arbitrary combination of groups selected from the group consisting of substituted or unsubstituted alkylene groups, substituted or unsubstituted arylene groups, substituted or unsubstituted heteroarylene groups, an ether group and an ester group, wherein X and Y may be the same or different.

Further, in one aspect of the present invention, each of X and Y in general formula (1) represents an unsubstituted alkylene group having a carbon number of at least 1 but not more than 10.

Specific examples of the polyfunctional amine (C1) used in the present invention include diethylenetriamine, iminobispropylamine (IBPA, 3,3'-diaminodipropylamine), N-(3-aminopropyl)butane-1,4-diamine (spermidine), 6,6-iminodihexylamine, 3,7-diazanonane-1,9-diamine and N,N'-bis(3-aminopropyl)ethylenediamine, and these polyfunctional amines (C1) may be used individually, or mixtures containing two or more compounds may be used. From the viewpoint of ease of synthesis, trifunctional amines such as diethylenetriamine, iminobispropylamine (IBPA, 3,3'-diaminodipropylamine), N-(3-aminopropyl)butane-1,4-diamine (spermidine) and 6,6-iminodihexylamine tend to enable a uniform polyurethane solution to be obtained more readily without gelling, and are consequently preferred.

Moreover, from the viewpoint of the physical properties, the carbon numbers of X and Y in general formula (1) are preferably 3 or greater. Specifically, using the examples listed above, polyurethane resins that use iminobispropylamine (IBPA), N-(3-aminopropyl)butane-1,4-diamine (spermidine) or 6,6-iminodihexylamine exhibit superior laminate strength to a polyurethane resin that uses diethylenetriamine.

Moreover, iminobispropylamine (IBPA) produces not only good laminate strength, but also yields favorable pigment dispersion stability and blocking resistance, and good dot reproducibility and plate clogging resistance, and is therefore particularly preferred.

In one aspect of the present invention, the polyamine (C) comprises the polyfunctional amine (C1) and a diamine (C2), wherein the ratio between the total number of moles of amino groups having an active hydrogen derived from the polyfunctional amine (C1), and the total number of moles of amino groups having an active hydrogen derived from the diamine (C2) is from 1:99 to 50:50. The polyamine may consist solely of the polyfunctional amine (C1) and the diamine (C2).

The ratio between the total number of moles of amino groups having an active hydrogen derived from the polyfunctional amine (C1), and the total number of moles of amino groups having an active hydrogen derived from the diamine (C2) is from 1:99 to 50:50, and is preferably from 5:95 to 35:65. If the total number of primary and/or secondary amino groups derived from the polyfunctional amine (C1) is too large, then there is an increased probability of a crosslinking reaction between main chains occurring as a secondary reaction, increasing the likelihood of gelling of the system. If the total number of primary and/or secondary amino groups derived from the polyfunctional amine (C1) is too small, then the primary structure of the polymer tends to become a linear polymer with little side chain extension, and as a result the plate clogging resistance and the dot reproducibility tend to deteriorate.

In the present invention, chain extension of the polyurethane resin prepolymer can be performed using a conventional diamine. Examples of the diamine (C2) include ethylenediamine, propylenediamine, hexamethylenediamine, isophoronediamine and dicyclohexylmethane-4,4'-diamine, as well as amines which also have a hydroxyl group within the molecule, such as 2-hydroxyethylethylenediamine, 2-hydroxyethylpropyldiamine, 2-hydroxyethylpropylenediamine, di-2-hydroxyethylethylenediamine, di-2-hydroxyethylenediamine, di-2-hydroxyethylpropylenediamine, 2-hydroxypropylethylenediamine, di-2-hydroxypropylethylenediamine and di-2-hydroxypropylethylenediamine. These chain extenders may be used individually, or mixtures containing two or more compounds may be used.

Further, for the purpose of lowering the viscosity of the resin solution product including the organic solvent, an amine having only a single amino group with an active hydrogen capable of reacting with an isocyanate group in each molecule may be used as an amine-based terminator. Examples of such compounds include dialkylamines such as di-n-butylamine (DBA), monoalkylamines such as cyclohexylamine, and amino alcohols.

One aspect of the present invention relates to a printing ink varnish in which the polymeric polyol (A) comprises a polyester polyol (A1) and a polyether polyol (A2). The polymeric polyol (A) may consist solely of the polyester polyol (A1) and the polyether polyol (A2).

Examples of the polymeric polyol (A) of the present invention include polyester polyols (A1), polyether polyols (A2), polycaprolactone diols, and polycarbonate polyols, and among these, the use of a combination of the polyester polyol (A1) and the polyether polyol (A2) is preferable. Further, the mass ratio between the polyester polyol (A1) and the polyether polyol (A2) is preferably from 99:1 to 50:50, and is more preferably from 90:10 to 70:30. If the proportion of the polyester polyol is 99% or greater, then the plate clogging properties tend to deteriorate, whereas if the proportion of the polyester polyol falls to 50% or less, then the ink film tends to become overly soft, meaning the blocking resistance tends to deteriorate.

Alternatively, a combination with a polycaprolactone diol and a polycarbonate polyol or the like may also be used.

Examples of the polyester polyol (A1) used in the present invention include condensation products obtained by an esterification reaction between a dibasic acid such as adipic acid, phthalic anhydride, isophthalic acid, terephthalic acid, maleic acid, fumaric acid, succinic acid, oxalic acid, malonic aid, pimelic acid, azelaic acid, sebacic acid, suberic acid, glutaric acid, 1,4-cyclohexyldicarboxylic acid, dimer acids or hydrogenated dimer acids, and a diol such as ethylene glycol, diethylene glycol, triethylene glycol, propylene glycol, 1,3-propanediol, 1,4-butanediol, 1,3-butanediol, 1,6-hexanediol, 1,8-octanediol, 1,9-nonanediol, neopentyl glycol, 3-methyl-1,5-pentanediol, 2-methyl-1,3-propanediol, 3,3,5-trimethylpentanediol, 2,4-diethyl-1,5-pentanediol, 1,12-octadecanediol, 1,2-alkanediols, 1,3-alkanediols, 1-monoglycerides, 2-monoglycerides, 1-monoglycerol ethers, 2-monoglycerol ethers, dimer diols, and hydrogenated dimer diols. Among the various possibilities, when the polyester polyol is used as a binder resin for a printing ink, a polyester polyol formed from adipic acid and a diol having a branched structure is particularly preferred in terms of improving the pigment dispersion stability, the laminate strength and the blocking resistance.

Examples of the above diol having a branched structure include 1,2-propanediol, 1,3-butanediol, 2-methyl-1,3-propanediol, neopentyl glycol, 1,4-pentanediol, 3-methyl-1,5-pentanediol, 2,5-hexanediol, 2-methyl-1,4-pentanediol, 2,4-diethyl-1,5-pentanediol, 2-butyl-2-ethyl-1,3-propanediol, 2-methyl-1,8-octanediol, 2,2,4-trimethyl-1,3-pentanediol and 2,2,4-trimethyl-1,6-hexanediol, and among these, neopentyl glycol and/or 3-methyl-1,5-pentanediol is particularly preferred. These compounds have solubility even in non-toluene solvents due to the effect of the branched methyl group(s), and are able to produce a polyester polyol that exhibits excellent adhesion to polyolefin films. Further, in the case of neopentyl glycol, the presence of two branched alkyl groups restricts rotation, meaning a tougher film is formed, and because the carbon number is 5, the hydrolysis resistance is also comparatively good. In contrast, in 3-methyl-1,5-pentanediol, the way in which the methyl group is branched is asymmetrical, unlike neopentyl glycol, and therefore the Tg of the resin falls, and a flexible yet tough film can be obtained. These polyester polyols (A1) may be used individually, or mixtures containing two or more compounds may be used.

The number-average molecular weight of the polyester polyol (A1) used in the present invention may be set appropriately with due consideration of the solubility, drying properties and blocking resistance and the like of the obtained polyurethane resin, but the molecular weight is typically within a range from 500 to 10,000, and preferably from 700 to 5,000. If the number-average molecular weight is less than 500, then the ink film tends to harden due to an increase in the amount of hard segments, and the PET laminate strength decreases. On the other hand, if the number-average molecular weight exceeds 10,000, then the proportion of hard segments decreases and the blocking resistance tends to deteriorate, but a balance between the laminate strength and the blocking properties can be achieved by using a combination of polyester polyols (A1) having different number-average molecular weights. The number-average molecular weight of the polyol used in the present invention is calculated from the hydroxyl value with hydroxyl groups at the ends, and can be determined from formula 1 below.

Number-average molecular weight of polyol=1,000× 56.1×hydroxyl group functionality/hydroxyl value    (Formula 1)

The acid value of the polyester polyol (A1) used in the present invention is preferably not more than 1.0 mgKOH/g, and is more preferably 0.5 mgKOH/g or less. The reason for this requirement is because if the acid value is greater than 1.0 mgKOH/g, then there is an increased tendency for the viscosity of the polyurethane varnish and the printing ink composition to increase over time.

Examples of the polyether polyol (A2) of the present invention include polyether polyols composed of polymers or copolymers of ethylene oxide, propylene oxide or tetrahydrofuran. In particular, polytetramethylene glycol and polypropylene glycol exhibit excellent solubility in alcohol-based solvents, and because different solvent solubility can be imparted to the polyester-based polyurethane, joint use of both types of compounds is preferred. In order to realize these types of properties, and also reduce the water resistance and the like, the number-average molecular weight of the polyether polyol (A2) is preferably from 700 to 3,000. Among the various possibilities, from the viewpoint of the stability at low temperature, a polypropylene glycol formed from propylene oxide is preferred. In order to ensure satisfactory low-temperature stability, blocking resistance, and oil resistance and the like, the amount used of the polyether polyol is preferably set so that the proportion of the polyether polyol (A2) within the combination of the polyester polyol (A1) and the polyether polyol (A2) is within a range from 1 to 50% by mass.

The polymeric polyol (A) preferably includes polymeric polyols having different number-average molecular weights. In long polyol portions, the distance between hard segments lengthens, which facilitates an increase in the laminate strength. In short polyol portions, the distance between hard segments shortens, which facilitates an improvement in the blocking resistance. By performing copolymerization with an isocyanate using a combination of polyols having dramatically different lengths, microphase separation can be better promoted, and both properties can be realized. Specifically, it is preferable to use at least one polyester polyol (A1) having a number-average molecular weight of 700, 1,000, 2,000, 3,000, 4,000 or 5,000, and at least one polyether polyol (A2) having a number-average molecular weight of 700, 1,000, 2,000 or 3,000, with the compounds selected so as to have mutually different molecular weights. If polymeric polyols having different molecular weights are used, then other polymeric polyols may include a polyester polyol and a polyether polyol having similar molecular weights. In the present invention, a combined system containing a total of four different polymeric polyols comprising polyester polyols having number-average molecular weights of 2,000 and 5,000, and polyether polyols having number-average molecular weights of 2,000 and 700 is preferred from the viewpoint of achieving a favorable balance between the blocking resistance and the PET laminate strength.

Further, because white inks and colored inks are different in terms of the pigments used and the pigment concentration, different polyurethanes are often designed for the different inks. In the case of white inks, an inorganic pigment such as titanium oxide is used and the pigment content is high, and because this means that the degree to which the resin contributes to blocking resistance is low, the number-average molecular weight of the polymeric polyol (A) is preferably from 2,000 to 4,000. On the other hand, in the case of colored inks, because organic pigments are mainly used and the pigment content is low, the number-average molecular weight is preferably from 1,000 to 3,000.

Examples of the polyisocyanate (B) used in the present invention include the various conventional aromatic diisocyanates, aliphatic diisocyanates and alicyclic diisocyanates typically used in the production of polyurethane resins. Specific examples include 1,5-naphthylene diisocyanate, 4,4'-diphenylmethane diisocyanate (MDI), 4,4'-diphenyldimethylmethane diisocyanate, 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, tolylene diisocyanate, butane-1,4-diisocyanate, hexamethylene diisocyanate, isopropylene diisocyanate, methylene diisocyanate, 2,2,4-trimethylhexamethylene diisocyanate, lysine diisocyanate, cyclohexane-1,4-diisocyanate, xylylene diisocyanate, isophorone diisocyanate, dimeryl diisocyanate, dicyclohexylmethane-4,4'-diisocyanate, 1,3-bis(isocyanatomethyl)cyclohexane, methylcyclohexane diisocyanate, norbornane 40 diisocyanate, m-tetramethylxylylene diisocyanate, 4,4-diphenylmethane diisocyanate, tolylene diisocyanate, bis-chloromethyl-diphenylmethane diisocyanate, 2,6-diisocyanatobenzyl chloride, and dimer diisocyanates in which the carboxyl groups of a dimer acid have been converted to isocyanate groups. These diisocyanate compounds may be used individually, or mixtures containing two or more compounds may be used.

The method used for synthesizing the polyurethane resin (D) used as a printing ink binder in the present invention is preferably a method in which the polymeric polyol (A) is reacted with the polyisocyanate (B), and reaction is then performed with the polyamine (C) to produce the polyurethane resin (D). The polyurethane resin (D) can be produced by a prepolymer method in which the polymeric polyol (A) and the polyisocyanate (B) are reacted at a temperature of 10 to 150° C. (urethanization reaction), if necessary using a solvent that is inert to isocyanate groups, and if necessary using a urethanization catalyst, thereby producing a prepolymer having isocyanate groups at the terminals, and this prepolymer is subsequently reacted with the polyamine (C) to obtain the polyurethane resin (D).

In the production of the prepolymer, the amounts of the polymeric polyol (A) and the polyisocyanate (B) are preferably set so that the ratio between the number of moles of isocyanate groups in the polyisocyanate (B) and the number of moles of hydroxyl groups in the polymeric polyol (A), namely the NCO/OH ratio, is within a range 0.5 to 3.0. If this ratio is less than 0.5, then satisfactory alkali resistance tends to be unobtainable, whereas if the ratio is greater than 3.0, then the solubility of the resulting prepolymer tends to worsen.

Further, using a solvent in the urethanization reaction is preferable from a reaction control perspective. In particular, when an isocyanate and an amine are subjected to a urea reaction, in order to achieve homogenous polymerization within the organic solvent to obtain a solution-based resin, it is essential that the type of solvent described below is used. If a solvent is not used, then the trifunctional amine reacts in a localized manner, causing gelling of the resin and making it impossible to achieve the desired properties. Examples of solvents that can be used in the urethanization reaction include ketones such as acetone, methyl ethyl ketone, methyl isobutyl ketone and cyclohexanone, ethers such as dioxane and tetrahydrofuran, esters such as ethyl acetate and butyl acetate, and halogenated hydrocarbons such as chlorobenzene and perchloroethylene. These solvents may be used individually, or a mixed solvent containing two or more solvents may be used. During the urea reaction, an alcohol such as isopropyl alcohol, ethyl alcohol, n-propyl alcohol, n-butyl alcohol or tert-butyl alcohol may be used in addition to the oil-based solvent described above, and a mixed solvent of ethyl acetate and isopropyl alcohol in a mass ratio of 40:60 to 60:40 is preferred.

Moreover, a catalyst may also be used in this urethanization reaction. Examples of catalysts that can be used include tertiary amine-based catalysts such as triethylamine and dimethylaniline, and metal-based catalysts such as tin and zinc. These catalysts are typically used in an amount within a range from 0.001 to 1 mol % relative to the polymeric polyol.

During the urea reaction of the chain extension, the prepolymer having isocyanate groups at the terminals obtained in the manner described above is added to the polyamine tank containing the stirred polyamine diluted in the above oil-based solvent, with the addition performed in a dropwise manner so that, if the total number of isocyanate functional groups in the prepolymer is deemed 100 mol %, the rate of addition of the prepolymer does not exceed 4 mol %/min Reaction is performed at a temperature of 10 to 50° C., yielding a high-molecular weight polyurethane resin (D) having active hydrogen atoms at the terminals. If even one of the aforementioned conditions among the dilution and stirring of the polyamine in the solvent and the dropwise addition rate not exceeding 4 mol %/min is not satisfied, then the reaction between the trifunctional or higher polyamine and the terminal isocyanate groups of the prepolymer tends to occur in a localized manner, increasing the likelihood of a gelled product, and making it impossible to obtain a uniform solution-based resin containing a non-aromatic organic solvent that is suitable for laminate inks.

When an amine-based polymerization terminator is used, the chain extension reaction may be performed using the polymerization terminator and the chain extender together, or the chain extender may first be used to achieve a certain degree of chain extension, and the polymerization terminator subsequently added alone to effect the end termination reaction. On the other hand, the molecular weight can also be controlled without using a polymerization terminator, and in such cases, a method in which the prepolymer is added to a solution containing the chain extender is preferable in terms of reaction control.

Furthermore, the reaction is performed so that the ratio of the total number of moles of primary and secondary amino groups in the polyamine (C) relative to the number of isocyanate equivalents in the prepolymer is within a range from 1.02 to 1.50, and preferably from 1.03 to 1.15. If this ratio is greater than 1.5, meaning the amount used of the polyamine (C) is large, then it is thought that the secondary amino group of the polyfunctional amine is less likely to react, meaning the primary structure of the polyurethane resin is less likely to develop branching. Further, the amount of simple amine remaining in the varnish as a result of none of the amino groups with an active hydrogen undergoing reaction tends to increase, which increases the likelihood of residual odor on the printed items.

The polyurethane resin (D) used as a printing ink binder in the present invention preferably has a weight-average molecular weight of 10,000 to 100,000. If the weight-average molecular weight is less than 10,000, then achieving satisfactory blocking resistance and solvent resistance in the printed items is difficult, whereas if the weight-average molecular weight exceeds 100,000, then the solubility of the resin in the ester solvent/alcohol solvent system of the present invention tends to deteriorate, meaning maintaining good printing effects is problematic.

The polyurethane resin (D) used as a printing ink binder in the present invention is preferably a polyurethane having an amine value from 1.0 to 10.0 mgKOH/g. If the amine value is lower than 1.0, then the adhesion to polyolefin-based films tends to deteriorate, whereas if the amine value exceeds 10.0, then the ink stability upon addition of the isocyanate-based curing agent tends to deteriorate.

The present invention also relates to a printing ink composition containing the printing ink varnish described above.

Non-aromatic organic solvents can be used as the solvent used in the printing ink composition of the present invention, and conventional solvents can be used, including ester-based solvents such as ethyl acetate, n-propyl acetate, isopropyl acetate, isobutyl acetate, propylene glycol monoethyl ether acetate and propylene glycol monomethyl ether acetate, and alcohol-based solvents such as methanol, ethanol, n-propanol, isopropanol, n-butanol, propylene glycol monoethyl ether and propylene glycol monomethyl ether. In recent years, concerns relating to the operating environment have lead to demands for eliminating aromatic organic solvents such as toluene and xylene, and ketone-based solvents such as methyl ethyl ketone and methyl isobutyl ketone, and the printing ink binder of the present invention can favorably use solvents free of such aromatic and ketone-based solvents. In the present invention, an ester-based solvent/alcohol-based solvent is particularly preferred.

In terms of the resins used in the printing ink composition of the present invention, a variety of resins can be used in combination with the polyurethane resin of the present invention, depending on the intended application and the substrate being used. Examples of other resins that may be used include vinyl chloride-vinyl acetate copolymer resins, chlorinated polypropylene resins, ethylene-vinyl acetate copolymer resins, vinyl acetate resins, polyamide resins, nitrocellulose resins, acrylic resins, polyester resins, alkyd resins, polyvinyl chloride resins, rosin-based resins, rosin-modified maleic acid resins, terpene resins, phenol-modified terpene resins, ketone resins, cyclized rubbers, chlorinated rubbers, butyral resins, petroleum resins, and modified resins of these resins. These resins may be used individually, or mixtures containing two or more resins may be used. The amount added of these other resins is preferably from 5 to 25% by mass relative to the total mass of the ink.

The hue of the printing ink containing the printing ink composition of the present invention can be altered depending on the type of colorant used, with process base colors totaling 5 colors including white, as well as yellow, red, indigo blue and black, and a further three colors outside the process gamut including red (orange), green and violet. In addition, transparent yellow, peony, vermilion, brown, gold, silver, pearl, substantially transparent media for adjusting color density (if necessary including an extender pigment), and the like are also prepared as base colors.

In printing inks, a technique is used in which a plurality of hues may be mixed to obtain a target hue, and in particular, a technique known as toning is sometimes used for white inks, in which, for example, a small amount of indigo blue ink is mixed into the ink. The white ink of the present invention may also be mixed with other inks. In addition to mixing with other inks, organic pigments, inorganic pigments and dyes may also be mixed into the white ink of the present invention according to need.

Examples of white inorganic pigments that can be used in the printing ink composition of the present invention include titanium oxide, zinc oxide, zinc sulfide, barium sulfate, calcium carbonate, chromium oxide and silica. The use of titanium oxide as the white ink pigment is preferable in terms of the coloring power, covering power, chemical resistance and weather resistance.

Examples of non-white inorganic pigments include pigments such as carbon black, aluminum and mica. Aluminum may be used as a powder or a paste, but in terms of handling properties and safety, is preferably used in the form of a paste, and whether leafing or non-leafing paste is selected may be determined as appropriate from the levels of luminance and density required.

Examples of the colorants used in the printing ink composition of the present invention include the types of organic and inorganic pigments and dyes typically used in inks, paints, and recording agents and the like. Examples of organic pigments that may be used include azo-based, phthalocyanine-based, anthraquinone-based, perylene-based, perinone-based, quinacridone-based, thioindigo-based, dioxazine-based, isoindolinone-based, quinophthalone-based, azomethine azo-based, diketopyrrolopyrrole-based and isoindoline-based pigments. In the case of an indigo blue ink, it is preferable to use copper phthalocyanine, whereas in the case of the transparent yellow ink, from the viewpoints of cost and light resistance, the use of C.I. Pigment Yellow 83 is preferable.

The colorant is preferably included in an amount sufficient to ensure satisfactory density and coloring power for the printing ink, namely a proportion of 1 to 50% by mass relative to the total mass of the printing ink. Further, these colorants may be used individually, or combinations of two or more colorants may be used.

Stable dispersion of the pigment in the organic solvent can be achieved using only the resin described above, but an additional dispersant may also be used to facilitate stable dispersion of the pigment. An anionic, nonionic, cationic or amphoteric surfactant or the like can be used as the dispersant. From the viewpoint of the ink storage stability, the amount of the dispersant is preferably at least 0.05% by mass relative to the total mass of the ink, and from the viewpoint of lamination applicability, the amount of the dispersant in the ink is preferably not more than 10% by mass. An amount within a range from 0.1 to 3% by mass is particularly preferable.

The printing ink composition of the present invention can be produced by dissolving and/or dispersing the polyurethane resin (D) and the colorant and the like in the organic solvent. Specifically, the ink can be produced by preparing a pigment dispersion by dispersing the pigment in the organic solvent using the polyurethane resin (D) and the dispersant mentioned above, and then adding additional polyurethane resin (D) or other compounds or the like as required, to the prepared pigment dispersion.

In the production of the pigment dispersion and the ink, conventional additives may be used as required, including pigment derivatives, dispersants, wetting agents, adhesion assistants, leveling agents, antifoaming agents, antistatic agents, trapping agents, blocking inhibitors and wax components.

The particle size distribution of the pigment in the pigment dispersion can be adjusted by appropriate control of factors such as the size of the grinding media used in the dispersion device, the grinding media filling rate, the dispersion treatment time, the discharge rate of the pigment dispersion, and the viscosity of the pigment dispersion. Examples of dispersion devices that may be used include typically used devices such as roller mills, ball mills, pebble mills, attritors and sand mills.

If the ink contains gas bubbles or unexpected coarse particles or the like, then the quality of the printed items deteriorates, and therefore filtration or the like is preferably used to remove such unwanted bubbles or coarse particles. Conventional filtration devices can be used.

The viscosity of the ink produced using the method described above is typically equivalent to a Zahn cup No. 4 viscosity of about 10 to 30 seconds from the viewpoints of preventing pigment precipitation and ensuring satisfactory dispersion, and is preferably within a range from 12 to 22 seconds from the viewpoint of operational efficiency during ink production and during printing.

The ink viscosity can be adjusted by appropriate selection of the types and amounts of the raw materials used, including the resin, the colorant and the organic solvent. Further, the ink viscosity can also be adjusted by altering the particle size and the particle size distribution of the pigment within the ink.

The present invention also relates to a printed item obtained by applying the printing ink composition described above to a printing substrate.

The printing ink composition of the present invention can be used in known printing systems such as gravure printing and flexographic printing systems. For example, the printing ink composition may be diluted with a diluting solvent to a viscosity and concentration suitable for gravure printing, and then supplied to each printing unit, either alone or as a mixture.

The printed item of the present invention can be obtained by using one of the printing systems mentioned above to apply the printing ink composition of the present invention to a film-like or sheet-like substrate formed from a polyolefin such as a polyethylene or polypropylene, a polyester such as a polyethylene terephthalate, polycarbonate or polylactic acid, a polystyrene-based resin such as a polystyrene, AS resin or ABS resin, or a nylon, polyamide, polyvinyl chloride, polyvinylidene chloride, cellophane, paper or aluminum, or a composite material of the above materials, and then performing drying in an oven to fix the ink film. The substrate may have been subjected to a surface deposition coating treatment with a metal oxide or the like, and/or a coating treatment with polyvinyl alcohol or the like, and may also have been subjected to other surface treatments such as a corona treatment.

The present invention also relates to a laminate formed by laminating a sealant to at least one surface of the printed item described above.

The laminate of the present invention can be obtained using a conventional lamination process, such as a typical extrusion lamination method in which a melted polyethylene resin is laminated to the printed surface of the aforementioned printed item via any of various anchor coating agents such as an imine-based, isocyanate-based, polybutadiene-based or titanium-based anchor coating agent, a dry lamination method in which a urethane-based or other type of adhesive is coated onto the printed surface and a plastic film is then laminated to the adhesive, or a direct lamination method in which a melted polypropylene is laminated by compression bonding directly onto the printed surface. Examples of the sealant used in the laminate include films of PE or CPP or the like, metal vapor deposition films such as VMCPP and VMPET, and metal foils of Al or the like.

EXAMPLES

The present invention is described below in further detail using a series of examples, but the present invention is in no way limited by these examples. In the present invention, unless specifically stated otherwise, the units "parts" and "%" indicate "parts by mass" and "% by mass" respectively.

The hydroxyl value is a value obtained in accordance with JIS K0070, by esterifying or acetylating the hydroxyl groups within the resin using an excess of an acid anhydride, back-titrating the residual acid with an alkali to calculate the amount of hydroxyl groups within 1 g of the resin, and then converting this amount of hydroxyl groups to an equivalent number of mg of potassium hydroxide. The amine value represents the number of mg of potassium hydroxide equivalent to the amount of hydrochloric acid required to neutralize the amino groups contained within 1 g of the resin. The acid value represents the number of mg of potassium hydroxide required to neutralize the acid groups contained within 1 g of the resin, and may be measured using a conventional measurement method, which is generally performed in accordance with JIS K0070 (1996). The method used for measuring the amine value was performed as follows. The molecular weight (weight-average molecular weight) of the polyurethane resin was measured by using a gel permeation chromatography (GPC) system "Shodex GPC System-21" manufactured by Showa Denko K.K. GPC is a liquid chromatography technique in which substances dissolved in a solvent are separated and quantified based on differences in molecular size. Tetrahydrofuran was used as the solvent, and determination of the weight-average molecular weight was made relative to standard polystyrenes.

[Method of Measuring Amine Value]

First, 0.5 to 2 g of the sample was weighed (sample mass: S g). Next, 30 mL of neutral ethanol (BDG neutral) was added to dissolve the weighed sample. The thus obtained solution was titrated with a 0.2 mol/l ethanolic hydrochloric acid solution (titer: f). The point when the color of the solution changes from green to yellow was deemed the end point, and the titer (A mL) at this end point was used to determine the amine value in accordance with the following formula (formula 2).

Amine value=$(A \times f \times 0.2 \times 56.108)/S$     (Formula 2)

Synthesis Example 1

A flask fitted with a stirrer, a thermometer, a reflux condenser and a nitrogen gas inlet was charged with 30 parts of ethyl acetate, 38.33 parts and 6.97 parts of two polycondensation products of adipic acid and 3-methyl-1,5-pentanediol (poly(3-methyl-1,5-pentanediol adipate)diol) having a hydroxyl value of 55.1 mgKOH/g and a number-average molecular weight of 2,000, and a hydroxyl value of 23.3 mgKOH/g and a number-average molecular weight of 5,000 respectively, 3.10 parts and 8.72 parts of two polypropylene glycols having a hydroxyl value of 157.0 mgKOH/g and a number-average molecular weight of 700, and a hydroxyl value of 55.9 mgKOH/g and a number-average molecular weight of 2,000 respectively, and 12.87 parts of isophorone diisocyanate, and the resulting mixture was reacted at 90° C. for 3 hours under a stream of nitrogen, yielding 100 parts of a uniform urethane prepolymer solution with a solid fraction of 70%. Subsequently, the urethane prepolymer solution was added dropwise over one hour at 35° C. to a mixture containing 4.09 parts of isophoronediamine, 0.51 parts of iminobispropylamine, 74.44 parts of ethyl acetate and 69.63 parts of isopropanol, and following completion of the dropwise addition, the mixture was held at 50° C. for one hour, thus obtaining a polyurethane resin composition (E-1). The solution of the thus obtained printing ink varnish (E-1) had a resin solid fraction concentration of 30.0% by mass and a viscosity of 1,220 mPa·s (25° C.), and the resin solid fraction had an amine value of 1.31 mgKOH/g, and a weight-average molecular weight of $3.6 \times 10^5$.

Synthesis Examples 2 to 25

Using the blend ratios of the numbers of parts shown in Table 1-1 and Table 1-2, printing ink varnishes (E-2 to E-25) were obtained using the same operations as those described for the polyurethane Synthesis Example 1.

Comparative Synthesis Examples 1 to 7

Using the blend ratios (% by mass) shown in Table 1-3, printing ink varnishes (F-1 to F-7) were obtained using the same operations as those described for the polyurethane Synthesis Example 1.

In Table 1-1, Table 1-2 and Table 1-3, PMPA represents poly(3-methyl-1,5-pentanediol adipate)diol, PPG represents poly(propylene glycol)diol, IPDI represents isophorone diisocyanate, IPDA represents isophoronediamine, IBPA represents iminobispropylamine(3,3'-diaminodipropylamine), DETA represents diethylenetriamine, spermidine represents N-(3-aminopropyl)butane-1,4-diamine, 6,6-IDHA represents 6,6-iminodihexylamine, 2,3,2-tetramine represents 3,7-diazanonane-1,9-diamine, DBA represents di-n-butylamine, EA represents ethyl acetate, and IPA represents isopropyl alcohol.

TABLE 1-1

| Reaction stage | Raw materials | | Synthesis Example 1 Varnish E-1 | 2 Varnish E-2 | 3 Varnish E-3 | 4 Varnish E-4 | 5 Varnish E-5 | 6 Varnish E-6 | 7 Varnish E-7 |
|---|---|---|---|---|---|---|---|---|---|
| Prepolymer (number of parts) | Solvent | EA | 30.00 | 30.00 | 30.00 | 30.00 | 30.00 | 30.00 | 30.00 |
| | Polyester polyol | PMPA (Mn 2000) | 38.33 | 38.33 | 38.33 | 38.33 | 38.33 | 38.33 | 38.33 |
| | | PMPA (Mn 5000) | 6.97 | 6.97 | 6.97 | 6.97 | 6.97 | 6.97 | 6.97 |
| | Polyether polyol | PPG (Mn 700) | 3.10 | 3.10 | 3.10 | 3.10 | 3.10 | 3.10 | 3.10 |
| | | PPG (Mn 2000) | 8.72 | 8.72 | 8.72 | 8.72 | 8.72 | 8.72 | 8.72 |
| | PMPA:PPG wt ratio | | 79:21 | 79:21 | 79:21 | 79:21 | 79:21 | 79:21 | 79:21 |
| | Diisocyanate | IPDI | 12.87 | 12.87 | 12.87 | 12.87 | 12.87 | 12.87 | 12.87 |
| | NCO/OH molar ratio | | 2.0 | 2.0 | 2.0 | 2.0 | 2.0 | 2.0 | 2.0 |
| | Prepolymer total number of parts | | 100 | 100 | 100 | 100 | 100 | 100 | 100 |
| Chain extension (number of parts) | Solvent | EA | 74.44 | 74.29 | 74.51 | 74.89 | 74.38 | 73.10 | 73.43 |
| | | IPA | 69.63 | 69.52 | 69.68 | 69.93 | 69.59 | 68.73 | 68.95 |
| | Diamine (C2) | IPDA | 4.09 | 4.09 | 4.09 | 4.09 | 4.09 | 2.12 | 2.61 |
| | Polyfunctional amine (C1) | IBPA | 0.51 | | | | | 1.52 | 1.27 |
| | | DETA | | 0.40 | | | | | |
| | | Spermidine | | | 0.56 | | | | |
| | | 6,6-IDHA | | | | 0.83 | | | |
| | | 2,3,2-tetramine | | | | | 0.46 | | |
| | Amine (terminator) | DBA | | | | | | 1.50 | |
| Total number of parts | | | 249 | 248 | 249 | 250 | 249 | 245 | 246 |
| Amino groups* with active hydrogen derived from C1:amino groups* with active hydrogen derived from C2 | | | 19:81 | 19:81 | 19:81 | 19:81 | 19:81 | 58:42 | 49:51 |

*excluding tertiary amino groups

TABLE 1-1-continued

| Urethane properties | Urethane/urea linkage number density | 1.55 | 1.55 | 1.55 | 1.55 | 1.55 | 1.57 | 1.57 |
|---|---|---|---|---|---|---|---|---|
| | Viscosity (cps) | 1220 | 1050 | 1500 | 1400 | 2030 | 1570 | 2040 |
| | Weight-average molecular weight (Mw)/10,000 | 3.6 | 3.5 | 3.6 | 3.7 | 4.1 | 3.6 | 4.0 |
| | Amine value (mgKOH/g) | 1.31 | 1.31 | 1.31 | 1.30 | 1.31 | 1.32 | 1.32 |

| | | | Synthesis Example | | | | | |
|---|---|---|---|---|---|---|---|---|
| Reaction stage | Raw materials | | 8 Varnish E-8 | 9 Varnish E-9 | 10 Varnish E-10 | 11 Varnish E-11 | 12 Varnish E-12 | 13 Varnish E-13 |
| Prepolymer (number of parts) | Solvent | EA | 30.00 | 30.00 | 30.00 | 30.00 | 30.00 | 30.00 |
| | Polyester polyol | PMPA (Mn 2000) | 38.33 | 38.33 | 38.33 | 38.33 | 38.33 | 38.33 |
| | | PMPA (Mn 5000) | 6.97 | 6.97 | 6.97 | 6.97 | 6.97 | 6.97 |
| | Polyether polyol | PPG (Mn 700) | 3.10 | 3.10 | 3.10 | 3.10 | 3.10 | 3.10 |
| | | PPG (Mn 2000) | 8.72 | 8.72 | 8.72 | 8.72 | 8.72 | 8.72 |
| | PMPA:PPG wt ratio | | 79:21 | 79:21 | 79:21 | 79:21 | 79:21 | 79:21 |
| | Diisocyanate | IPDI | 12.87 | 12.87 | 12.87 | 12.87 | 12.87 | 12.87 |
| | NCO/OH molar ratio | | 2.0 | 2.0 | 2.0 | 2.0 | 2.0 | 2.0 |
| | Prepolymer total number of parts | | 100 | 100 | 100 | 100 | 100 | 100 |
| Chain extension (number of parts) | Solvent | EA | 73.77 | 74.10 | 74.77 | 74.94 | 73.76 | 73.41 |
| | | IPA | 69.18 | 69.40 | 69.85 | 69.96 | 69.17 | 68.94 |
| | Diamine (C2) | IPDA | 3.11 | 3.60 | 4.58 | 4.83 | 3.35 | 3.11 |
| | Polyfunctional amine (C1) | IBPA | 1.01 | 0.76 | 0.25 | 0.13 | 0.76 | 0.76 |
| | | DETA | | | | | | |
| | | Spermidine | | | | | | |
| | | 6,6-IDHA | | | | | | |
| | | 2,3,2-tetramine | | | | | | |
| | Amine (terminator) | DBA | | | | | 0.37 | 0.75 |
| Total number of parts | | | 247 | 248 | 249 | 250 | 247 | 246 |
| Amino groups* with active hydrogen derived from C1:amino groups* with active hydrogen derived from C2 *excluding tertiary amino groups | | | 39:61 | 29:71 | 10:90 | 5:95 | 31:69 | 32:68 |
| Urethane properties | Urethane/urea linkage number density | | 1.56 | 1.56 | 1.55 | 1.55 | 1.56 | 1.57 |
| | Viscosity (cps) | | 1820 | 1310 | 1110 | 980 | 760 | 550 |
| | Weight-average molecular weight (Mw)/10,000 | | 3.9 | 3.8 | 3.4 | 3.2 | 3.8 | 3.6 |
| | Amine value (mgKOH/g) | | 1.32 | 1.31 | 1.30 | 1.30 | 1.32 | 1.32 |

TABLE 1-2

| | | | Synthesis Example | | | | | |
|---|---|---|---|---|---|---|---|---|
| Reaction stage | Raw materials | | 14 Varnish E-14 | 15 Varnish E-15 | 16 Varnish E-16 | 17 Varnish E-17 | 18 Varnish E-18 | 19 Varnish E-19 |
| Prepolymer (number of parts) | Solvent | EA | 30.00 | 30.00 | 30.00 | 30.00 | 30.00 | 30.00 |
| | Polyester polyol | PMPA (Mn 2000) | 38.33 | 38.33 | 38.33 | 38.33 | 38.33 | 38.33 |
| | | PMPA (Mn 5000) | 6.97 | 6.97 | 6.97 | 6.97 | 6.97 | 6.97 |
| | Polyether polyol | PPG (Mn 700) | 3.10 | 3.10 | 3.10 | 3.10 | 3.10 | 3.10 |
| | | PPG (Mn 2000) | 8.72 | 8.72 | 8.72 | 8.72 | 8.72 | 8.72 |
| | PMPA:PPG wt ratio | | 79:21 | 79:21 | 79:21 | 79:21 | 79:21 | 79:21 |
| | Diisocyanate | IPDI | 12.87 | 12.87 | 12.87 | 12.87 | 12.87 | 12.87 |
| | NCO/OH molar ratio | | 2.0 | 2.0 | 2.0 | 2.0 | 2.0 | 2.0 |
| | Prepolymer total number of parts | | 100 | 100 | 100 | 100 | 100 | 100 |
| Chain extension (number of parts) | Solvent | EA | 74.46 | 74.57 | 74.68 | 74.78 | 75.00 | 75.05 |
| | | IPA | 69.64 | 69.71 | 69.78 | 69.86 | 70.00 | 70.04 |
| | Diamine (C2) | IPDA | 2.12 | 2.61 | 3.11 | 3.60 | 4.58 | 4.83 |
| | Polyfunctional amine (C1) | IBPA | | | | | | |
| | | DETA | | | | | | |
| | | Spermidine | | | | | | |
| | | 6,6-IDHA | 2.49 | 2.08 | 1.66 | 1.25 | 0.42 | 0.21 |
| | | 2,3,2-tetramine | | | | | | |
| | Amine (terminator) | DBA | 1.50 | | | | | |
| Total number of parts | | | 249 | 249 | 249 | 249 | 250 | 250 |
| Amino groups* with active hydrogen derived from C1:amino groups* with active hydrogen derived from C2 *excluding tertiary amino groups | | | 58:42 | 49:51 | 39:61 | 29:71 | 10:90 | 5:95 |
| Urethane properties | Urethane/urea linkage number density | | 1.55 | 1.55 | 1.55 | 1.55 | 1.54 | 1.54 |
| | Viscosity (cps) | | 1700 | 2380 | 2070 | 1600 | 1340 | 1240 |
| | Weight-average molecular weight | | 4.0 | 4.2 | 4.0 | 3.7 | 3.3 | 3.2 |

TABLE 1-2-continued

| | | | | | | | | |
|---|---|---|---|---|---|---|---|---|
| | (Mw)/10,000 | | | | | | | |
| | Amine value (mgKOH/g) | | 1.31 | 1.31 | 1.30 | 1.30 | 1.30 | 1.30 |

| | | | Synthesis Example | | | | | |
|---|---|---|---|---|---|---|---|---|
| Reaction stage | Raw materials | | 20 Varnish E-20 | 21 Varnish E-21 | 22 Varnish E-22 | 23 Varnish E-23 | 24 Varnish E-24 | 25 Varnish E-25 |
| Prepolymer (number of parts) | Solvent | EA | 30.00 | 30.00 | 30.00 | 30.00 | 30.00 | 30.00 |
| | Polyester polyol | PMPA (Mn 2000) | 36.97 | 39.42 | 45.51 | | 57.46 | |
| | | PMPA (Mn 5000) | 6.73 | 7.17 | | 46.05 | | |
| | Polyether polyol | PPG (Mn 700) | 2.99 | 3.19 | | 12.15 | | |
| | | PPG (Mn 2000) | 8.41 | 8.97 | 11.92 | | | 57.31 |
| | PMPA:PPG wt ratio | | 79:21 | 79:21 | 79:21 | 79:21 | 100:0 | 0:100 |
| | Diisocyanate | IPDI | 14.90 | 11.25 | 12.57 | 11.80 | 12.54 | 12.69 |
| | NCO/OH molar ratio | | 2.4 | 1.7 | 2.0 | 2.0 | 2.0 | 2.0 |
| | Prepolymer total number of parts | | 100 | 100 | 100 | 100 | 100 | 100 |
| Chain extension (number of parts) | Solvent | EA | 76.69 | 72.63 | 74.29 | 73.90 | 74.27 | 74.35 |
| | | IPA | 71.73 | 68.42 | 69.53 | 69.27 | 69.51 | 69.56 |
| | Diamine (C2) | IPDA | 5.53 | 2.95 | 4.00 | 3.75 | 3.99 | 4.03 |
| | Polyfunctional amine (C1) | IBPA | 0.68 | 0.36 | 0.49 | 0.46 | 0.49 | 0.50 |
| | | DETA | | | | | | |
| | | Spermidine | | | | | | |
| | | 6,6-IDHA | | | | | | |
| | | 2,3,2-tetramine | | | | | | |
| | Amine (terminator) | DBA | | | | | | |
| | Total number of parts | | 254 | 244 | 248 | 247 | 248 | 248 |
| | Amino groups* with active hydrogen derived from C1:amino groups* with active hydrogen derived from C2 *excluding tertiary amino groups | | 19:81 | 19:81 | 19:81 | 19:81 | 19:81 | 19:81 |
| Urethane properties | Urethane/urea linkage number density | | 1.76 | 1.38 | 1.52 | 1.43 | 1.52 | 1.53 |
| | Viscosity (cps) | | 1590 | 1010 | 1170 | 1670 | 1840 | 830 |
| | Weight-average molecular weight (Mw)/10,000 | | 3.8 | 3.5 | 3.6 | 3.7 | 3.6 | 3.6 |
| | Amine value (mgKOH/g) | | 1.73 | 0.96 | 1.28 | 1.20 | 1.28 | 1.29 |

TABLE 1-3

| | | | Comparative Synthesis Example | | | | | | |
|---|---|---|---|---|---|---|---|---|---|
| Reaction stage | Raw materials | | 1 Varnish F-1 | 2 Varnish F-2 | 3 Varnish F-3 | 4 Varnish F-4 | 5 Varnish F-5 | 6 Varnish F-6 | 7 Varnish F-7 |
| Prepolymer (number of parts) | Solvent | EA | 30.00 | 30.00 | 30.00 | 30.00 | 30.00 | 30.00 | 30.00 |
| | Polyester polyol | PMPA (Mn 2000) | 38.33 | 38.33 | 38.33 | 45.51 | | 59.05 | |
| | | PMPA (Mn 5000) | 6.97 | 6.97 | 6.97 | | 44.54 | | |
| | Polyether polyol | PPG (Mn 700) | 3.10 | 3.10 | 3.10 | | 11.75 | | |
| | | PPG (Mn 2000) | 8.72 | 8.72 | 8.72 | 11.92 | | | 57.31 |
| | PMPA:PPG wt ratio | | 79:21 | 79:21 | 79:21 | 79:21 | 79:21 | 100:0 | 0:100 |
| | Diisocyanate | IPDI | 12.87 | 12.87 | 12.87 | 12.57 | 13.70 | 10.95 | 12.69 |
| | NCO/OH molar ratio | | 2.0 | 2.4 | 1.7 | 2.0 | 2.0 | 2.0 | 2.0 |
| | Prepolymer total number of parts | | 100 | 100 | 100 | 100 | 100 | 100 | 101 |
| Chain extension (number of parts) | Solvent | EA | 75.11 | 75.11 | 75.11 | 74.94 | 76.83 | 72.98 | 75.01 |
| | | IPA | 70.07 | 70.07 | 70.07 | 69.96 | 71.22 | 68.65 | 70.01 |
| | Diamine (C2) | IPDA | 5.08 | 5.08 | 5.08 | 4.96 | 6.31 | 3.56 | 5.01 |
| | Polyfunctional amine (C1) | IBPA | | | | | | | |
| | | DETA | | | | | | | |
| | | Spermidine | | | | | | | |
| | | 6,6-IDHA | | | | | | | |
| | | 2,3,2-tetramine | | | | | | | |
| | Amine (terminator) | DBA | | | | | | | |
| | Total number of parts | | 250 | 250 | 250 | 250 | 254 | 245 | 251 |
| | Amino groups* with active hydrogen derived from C1:amino groups* with active hydrogen derived from C2 *excluding tertiary amino groups | | 0:100 | 0:100 | 0:100 | 0:100 | 0:100 | 0:100 | 0:100 |
| Urethane properties | Urethane/urea linkage number density | | 1.54 | 1.54 | 1.54 | 1.51 | 1.62 | 1.34 | 1.52 |
| | Viscosity | | 900 | 700 | 1220 | 1310 | 590 | 890 | 420 |
| | Weight-average molecular weight (Mw)/10,000 | | 3.1 | 3.3 | 3.0 | 3.1 | 3.2 | 3.2 | 3.1 |
| | Amine value (mgKOH/g) | | 1.30 | 1.30 | 1.30 | 1.27 | 1.59 | 0.93 | 1.28 |

<Preparation of Printing Inks>

Example 1

Ten parts of copper phthalocyanine blue (C.I. Pigment Blue 15:3), 20 parts of the printing ink varnish (E-1), 5 parts of isopropyl alcohol and 5 parts of n-propyl acetate were mixed together, and following kneading using a sand mill, 15 parts of the printing ink varnish (E-1), 35 parts of a mixed solvent of isopropyl alcohol and ethyl acetate in a ratio of 40:60, and 10 parts of a mixed solvent of n-propyl acetate and isopropyl alcohol (mass ratio 75:25) were added and mixed to obtain an indigo blue ink (G-1). One hundred parts of the thus obtained ink was mixed with 50 parts of a mixed solvent of n-propyl acetate and isopropyl alcohol (mass ratio 75:25) to prepare a dilute ink.

Example 26, Comparative Example 8

Thirty parts of Titanix JR-805 (manufactured by Tayca Corporation), 10 parts of the printing ink varnish (E-1), 5 parts of n-propyl acetate and 5 parts of isopropyl alcohol were mixed together, and following kneading using a sand mill, 30 parts of the printing ink varnish (E-1) and 20 parts of a mixed solvent of isopropyl alcohol and ethyl acetate in a ratio of 40:60 were added and mixed to obtain a white printing ink (G-26). To 100 parts of the thus obtained white ink was added and mixed 50 parts of a mixed solvent of isopropyl alcohol and n-propyl acetate (mass ratio 25:75) as a diluting solvent, thus obtaining a white dilute printing ink.

Examples 2 to 25, and 27 to 50

Using the same method as that described for Example 1, the resin solutions of the printing ink varnishes (E-1 to E-25) obtained in Synthesis Examples 1 to 25 were used to prepare indigo blue inks G-2 to G-25. The blend compositions are shown in Table 2-1-1 and Table 2-1-2. In a similar manner, yellow, red and black inks G-27 to G-50 were also prepared. The blend compositions are shown in Table 2-2-1 and Table 2-2-2. In the tables, the amount of the polyurethane resin solution (the amount used of the printing ink varnish) indicates the total mass of the solution used in the formulation.

Comparative Examples 1 to 7, and 9 to 14

Using the printing ink varnishes F-1 to F-7 obtained in Comparative Synthesis Examples 1 to 7, indigo blue, yellow, red and black inks (H-1 to H-14) were prepared in the same manner as described above. The blend compositions are shown in Table 2-3. In the table, the amount of the polyurethane resin solution (the amount used of the printing ink varnish) indicates the total mass of the solution used in the formulation.

For each of the inks obtained in Examples 1 to 50 and Comparative Examples 1 to 14, the coating film properties were evaluated by testing the blocking resistance, the laminate strength and the dry laminate strength, and the printability was evaluated by testing the plate clogging resistance and the dot reproducibility. However, the dot reproducibility test was not performed for the white ink of Example 26.

For the evaluations of the coating film properties, each of the dilute inks described above was printed onto a corona-treated OPP film (FOR #20, manufactured by Futamura Chemical Co., Ltd.) and a corona-treated PET film (E5100 #12, manufactured by Toyobo Co., Ltd.) at a rate of 40 m/min using a gravure proof press fitted with a gravure plate having a plate depth of 35 μm, and drying was then performed at 40 to 50° C. to obtain the printed items. The thus obtained printed items were subjected to the tests described below.

<Blocking Resistance>

Films of the above corona-treated OPP printed items were superimposed so that the printed surface of one film contacted the non-printed surface of another film, a load of 10 kgf/cm$^2$ was applied, and the films were left to stand for 24 hours in an atmosphere at 40° C. and 80% RH. Following removal of the films, the state of ink transfer to the non-printed surface was evaluated using a 4-grade scale. The evaluation results are shown in Table 2-1-1, Table 2-1-2, Table 2-2-1, Table 2-2-2 and Table 2-3.

AA: amount of ink transfer to non-printed surface of 0%
A: amount of ink transfer of less than 10%
B: amount of ink transfer of at least 10% but less than 30%
A: amount of ink transfer of 30% or more <PET Laminate Strength>

A butadiene-based anchor coating agent (EL451, manufactured by Toyo-Morton, Ltd.) was applied as a NV 1 wt % methanol solution to the each of the above PET film printed items, an extrusion laminator (manufactured by Musashino Kikai Co., Ltd.) was used to melt (at a temperature of 320° C.) and laminate an 18 μm layer of a melted polyethylene (LC600A, manufactured by Japan Polychem Corporation) at a line speed of 100 m/min, and the melted polyethylene was bonded to VMPET (DIALUSTER H27 #12 (manufactured by Reiko Co., Ltd.)). Subsequently, CPP (FCMN #20 (manufactured by Mitsui Chemicals Tohcello Inc.)) was bonded in the same manner. The resulting laminate was cut to a length of 150 mm and a width of 15 mm, the laminate was parted at the ink-film interface, and the laminate strength in a 90° direction was measured using a Tensilon tensile strength tester. The results are shown in Table 2-1-1, Table 2-1-2, Table 2-2-1, Table 2-2-2 and Table 2-3. The evaluation criteria were as shown below.

AA: 1.0 N/15 mm or greater
A: at least 0.5 N/15 mm but less than 1.0 N/15 mm
B: at least 0.3 N/15 mm but less than 0.5 N/15 mm
C: less than 0.3 N/15 mm <PET Dry Laminate Strength>

A solution prepared by diluting a 1:1 mixture of a polyether-polyurethane-based main agent (TM-329, manufactured by Toyo-Morton, Ltd.) and a polyisocyanate-based curing agent (CAT-18B, manufactured by Toyo-Morton, Ltd.) with ethyl acetate to obtain a solution of NV 30 wt % was applied to each of the above PET film printed items, and a dry laminator was then used to bond a PE (TUX-FCD #50 (manufactured by Mitsui Chemicals Tohcello Inc.)) at a line speed of 40 m/min. The resulting laminate was cut to a length of 150 mm and a width of 15 mm, the laminate was parted at the ink-film interface, and the laminate strength in a 90° direction was measured using a Tensilon tensile strength tester. The evaluation criteria were as shown below. The evaluation results are shown in Table 2-1-1, Table 2-1-2, Table 2-2-1, Table 2-2-2 and Table 2-3.

AA: 2.0 N/15 mm or greater
A: at least 1.5 N/15 mm but less than 2.0 N/15 mm
B: at least 1.0 N/15 mm but less than 1.5 N/15 mm
C: less than 1.0 N/15 mm The printability evaluation was performed in a gravure printing machine manufactured by Fuji Kikai Kogyo Co. Ltd., using an impression cylinder formed from a NBR (nitrile-butadiene rubber) with a rubber hardness of 80 Hs, a ceramic-coated doctor blade having a blade tip width of 60 μm (thickness of base material: 40 μm, thickness of ceramic layer on each side: 10 μm), an electronic engraving plate (stylus angle: 120 degrees, colored inks: 250 lines/inch, white ink: 200 lines/inch) having a chromium hardness of 1050 Hv, manufactured by Toyo Prepress Co., Ltd., and 5 kg of a dilute ink having the same composition as one of the Examples or Comparative Examples. During the evaluation, a viscosity controller was used, and the appropriate diluting solvent was replenished as required to maintain a constant viscosity.

<Plate Clogging Resistance>

Using a doctor pressure of 2 kg/cm² and a printing speed of 200 m/min, 8,000 m of printing was performed onto corona-treated OPP film, and the ink deposition properties in the highlight regions (1% halftone dots to 10% halftone dots) of the printed item immediately after starting printing and the printed item after printing 8,000 m were evaluated visually. The evaluation criteria were as shown below. The evaluation results are shown in Table 2-1-1, Table 2-1-2, Table 2-2-1, Table 2-2-2 and Table 2-3.

AA: a substantially similar level of ink deposition in the highlight regions was confirmed immediately after starting printing and after printing 8,000 m.

A: comparison of the ink deposition in the highlight regions immediately after starting printing and after printing 8,000 m revealed a slight deterioration in the ink deposition.

B: comparison of the ink deposition in the highlight regions immediately after starting printing and after printing 8,000 m revealed a significant deterioration in the ink deposition.

C: the ink deposition was poor from immediately after starting printing.

<Dot Reproducibility>

Using a doctor pressure of 2 kg/cm² and a printing speed of 200 m/min, a colored ink and a white ink were printed in that order onto a corona-treated OPP film, a dot of a 50% single color portion and a dot composed of a 50% color portion overprinted with solid white were compared, and the dot reproducibility was evaluated on the basis of the state of dot dissolution. Evaluations were performed by overprinting the white ink of G-26 on each ink from the Examples, and overprinting the white ink of H-8 onto each ink from the Comparative Examples. The evaluation criteria were as shown below. The evaluation results are shown in Table 2-1-1, Table 2-1-2, Table 2-2-1, Table 2-2-2 and Table 2-3.

AA: the dots of the single color printed item and the white overprinted item exhibited no difference in shape or density.

A: compared with the dot of the single color printed item, the colored dot of the white overprinted item had dissolved and spread slightly.

B: compared with the dot of the single color printed item, the colored dot of the white overprinted item had dissolved and spread.

C: compared with the dot of the single color printed item, the colored dot of the white overprinted item had dissolved and spread significantly, and the density inside the dot had decreased.

TABLE 2-1-1

| | | | Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| | Formulation | | G-1 | G-2 | G-3 | G-4 | G-5 | G-6 | G-7 | G-8 | G-9 | G-10 | G-11 | G-12 | G-13 |
| Blend composition | Printing ink varnish | Varnish name | E-1 | E-2 | E-3 | E-4 | E-5 | E-6 | E-7 | E-8 | E-9 | E-10 | E-11 | E-12 | E-13 |
| | | Amount used | 35 | 35 | 35 | 35 | 35 | 35 | 35 | 35 | 35 | 35 | 35 | 35 | 35 |
| | Colorant | White pigment (Titanix JR-805) | | | | | | | | | | | | | |
| | | Indigo blue pigment (C.I. Pigment Blue 15:3) | 10 | 10 | 10 | 10 | 10 | 10 | 10 | 10 | 10 | 10 | 10 | 10 | 10 |
| | | Yellow pigment (C.I. Pigment Yellow 14) | | | | | | | | | | | | | |
| | | Red pigment (C.I. Pigment Red 57:1) | | | | | | | | | | | | | |
| | | Black pigment (C.I. Pigment Black 7) | | | | | | | | | | | | | |
| | Kneading solvent | Isopropyl alcohol | 5 | 5 | 5 | 5 | 5 | 5 | 5 | 5 | 5 | 5 | 5 | 5 | 5 |
| | | n-propyl acetate | 5 | 5 | 5 | 5 | 5 | 5 | 5 | 5 | 5 | 5 | 5 | 5 | 5 |
| | Solvent | IPA:ethyl acetate 40:60 mixture | 35 | 35 | 35 | 35 | 35 | 35 | 35 | 35 | 35 | 35 | 35 | 35 | 35 |
| | | IPA:n-propyl acetate 25:75 mixture | 10 | 10 | 10 | 10 | 10 | 10 | 10 | 10 | 10 | 10 | 10 | 10 | 10 |
| Coating film properties evaluations | | Blocking resistance | A | AA | A | B | A | A | B | B | A | A | A | AA | AA |
| | | PET laminate strength | AA | A | AA | AA | B | B | A | AA | AA | A | A | AA | AA |
| | | PET dry laminate strength | AA | B | A | A | B | A | A | A | AA | AA | AA | AA | AA |
| Printability evaluations | | Plate clogging resistance | AA | AA | AA | AA | A | A | A | AA | AA | A | B | AA | AA |
| | | Dot reproducibility | AA | A | A | A | AA | AA | AA | AA | AA | A | B | AA | AA |

TABLE 2-1-2

| | | | Example | | | | | | | | | | | |
|---|---|---|---|---|---|---|---|---|---|---|---|---|---|
| | | | 14 | 15 | 16 | 17 | 18 | 19 | 20 | 21 | 22 | 23 | 24 | 25 |
| | Formulation | | G-14 | G-15 | G-16 | G-17 | G-18 | G-19 | G-20 | G-21 | G-22 | G-23 | G-24 | G-25 |
| Blend composition | Printing ink varnish | Varnish name | E-14 | E-15 | E-16 | E-17 | E-18 | E-19 | E-20 | E-21 | E-22 | E-23 | E-24 | E-25 |
| | | Amount used | 35 | 35 | 35 | 35 | 35 | 35 | 35 | 35 | 35 | 35 | 35 | 35 |

TABLE 2-1-2-continued

|  |  |  | Example | | | | | | | | | | | |
|---|---|---|---|---|---|---|---|---|---|---|---|---|---|---|
|  |  |  | 14 | 15 | 16 | 17 | 18 | 19 | 20 | 21 | 22 | 23 | 24 | 25 |
|  | Formulation |  | G-14 | G-15 | G-16 | G-17 | G-18 | G-19 | G-20 | G-21 | G-22 | G-23 | G-24 | G-25 |
|  | Colorant | White pigment (Titanix JR-805) |  |  |  |  |  |  |  |  |  |  |  |  |
|  |  | Indigo blue pigment (C.I. Pigment Blue 15:3) | 10 | 10 | 10 | 10 | 10 | 10 | 10 | 10 | 10 | 10 | 10 | 10 |
|  |  | Yellow pigment (C.I. Pigment Yellow 14) |  |  |  |  |  |  |  |  |  |  |  |  |
|  |  | Red pigment (C.I. Pigment Red 57:1) |  |  |  |  |  |  |  |  |  |  |  |  |
|  |  | Black pigment (C.I. Pigment Black 7) |  |  |  |  |  |  |  |  |  |  |  |  |
|  | Kneading solvent | Isopropyl alcohol | 5 | 5 | 5 | 5 | 5 | 5 | 5 | 5 | 5 | 5 | 5 | 5 |
|  |  | n-propyl acetate | 5 | 5 | 5 | 5 | 5 | 5 | 5 | 5 | 5 | 5 | 5 | 5 |
|  | Solvent | IPA:ethyl acetate 40:60 mixture | 35 | 35 | 35 | 35 | 35 | 35 | 35 | 35 | 35 | 35 | 35 | 35 |
|  |  | IPA:n-propyl acetate 25:75 mixture | 10 | 10 | 10 | 10 | 10 | 10 | 10 | 10 | 10 | 10 | 10 | 10 |
| Coating film properties evaluations | Blocking resistance |  | AA | B | B | A | A | A | AA | B | A | B | B | B |
|  | PET laminate strength |  | A | A | AA | AA | AA | A | B | AA | B | B | B | B |
|  | PET dry laminate strength |  | A | B | B | A | A | A | A | AA | A | A | A | AA |
| Printability evaluations | Plate clogging resistance |  | A | A | AA | AA | A | B | AA | AA | AA | AA | AA | AA |
|  | Dot reproducibility |  | AA | AA | AA | AA | A | B | AA | AA | AA | AA | AA | A |

TABLE 2-2-1

|  |  |  | Example | | | | | | | | | | | | |
|---|---|---|---|---|---|---|---|---|---|---|---|---|---|---|---|
|  |  |  | 26 | 27 | 28 | 29 | 30 | 31 | 32 | 33 | 34 | 35 | 36 | 37 | 38 |
|  | Formulation |  | G-26 | G-27 | G-28 | G-29 | G-30 | G-31 | G-32 | G-33 | G-34 | G-35 | G-36 | G-37 | G-38 |
| Blend composition | Printing ink varnish | Varnish name | E-1 | E-1 | E-1 | E-1 | E-8 | E-8 | E-8 | E-9 | E-9 | E-9 | E-10 | E-10 | E-10 |
|  |  | Amount used | 40 | 35 | 35 | 35 | 35 | 35 | 35 | 35 | 35 | 35 | 35 | 35 | 35 |
|  | Colorant | White pigment (Titanix JR-805) | 30 |  |  |  |  |  |  |  |  |  |  |  |  |
|  |  | Indigo blue pigment (C.I. Pigment Blue 15:3) |  |  |  |  |  |  |  |  |  |  |  |  |  |
|  |  | Yellow pigment (C.I. Pigment Yellow 14) |  | 10 |  |  | 10 |  |  | 10 |  |  | 10 |  |  |
|  |  | Red pigment (C.I. Pigment Red 57:1) |  |  | 10 |  |  | 10 |  |  | 10 |  |  | 10 |  |
|  |  | Black pigment (C.I. Pigment Black 7) |  |  |  | 10 |  |  | 10 |  |  | 10 |  |  | 10 |
|  | Kneading solvent | Isopropyl alcohol | 5 | 5 | 5 | 5 | 5 | 5 | 5 | 5 | 5 | 5 | 5 | 5 | 5 |
|  |  | n-propyl acetate | 5 | 5 | 5 | 5 | 5 | 5 | 5 | 5 | 5 | 5 | 5 | 5 | 5 |
|  | Solvent | IPA:ethyl acetate 40:60 mixture | 20 | 35 | 35 | 35 | 35 | 35 | 35 | 35 | 35 | 35 | 35 | 35 | 35 |
|  |  | IPA:n-propyl acetate 25:75 mixture |  | 10 | 10 | 10 | 10 | 10 | 10 | 10 | 10 | 10 | 10 | 10 | 10 |
| Coating film properties evaluations | Blocking resistance |  | A | A | A | A | B | B | B | A | A | A | A | A | A |
|  | PET laminate strength |  | AA | AA | AA | A | AA | AA | A | AA | AA | A | A | A | A |
|  | PET dry laminate strength |  | AA | AA | AA | A | A | A | A | AA | AA | A | AA | AA | A |
| Printability evaluations | Plate clogging resistance |  | A | AA | AA | AA | AA | AA | AA | AA | AA | AA | A | A | A |
|  | Dot reproducibility |  | — | AA | AA | AA | AA | AA | AA | AA | AA | AA | A | A | A |

TABLE 2-2-2

|  |  |  | Example | | | | | | | | | | | |
|---|---|---|---|---|---|---|---|---|---|---|---|---|---|---|
|  |  |  | 39 | 40 | 41 | 42 | 43 | 44 | 45 | 46 | 47 | 48 | 49 | 50 |
|  | Formulation |  | G-39 | G-40 | G-41 | G-42 | G-43 | G-44 | G-45 | G-46 | G-47 | G-48 | G-49 | G-50 |
| Blend composition | Printing ink varnish | Varnish name | E-12 | E-12 | E-12 | E-13 | E-13 | E-13 | E-17 | E-17 | E-17 | E-21 | E-21 | E-21 |
|  |  | Amount used | 35 | 35 | 35 | 35 | 35 | 35 | 35 | 35 | 35 | 35 | 35 | 35 |
|  | Colorant | White pigment (Titanix JR-805) |  |  |  |  |  |  |  |  |  |  |  |  |
|  |  | Indigo blue pigment |  |  |  |  |  |  |  |  |  |  |  |  |

TABLE 2-2-2-continued

|  |  |  | Example |  |  |  |  |  |  |  |  |  |  |  |
|---|---|---|---|---|---|---|---|---|---|---|---|---|---|---|
|  |  |  | 39 | 40 | 41 | 42 | 43 | 44 | 45 | 46 | 47 | 48 | 49 | 50 |
|  | Formulation |  | G-39 | G-40 | G-41 | G-42 | G-43 | G-44 | G-45 | G-46 | G-47 | G-48 | G-49 | G-50 |
|  |  | (C.I. Pigment Blue 15:3) Yellow pigment (C.I. Pigment Yellow 14) | 10 |  | 10 |  | 10 |  | 10 |  | 10 |  | 10 |  |
|  |  | Red pigment (C.I. Pigment Red 57:1) |  | 10 |  | 10 |  | 10 |  | 10 |  | 10 |  | 10 |
|  |  | Black pigment (C.I. Pigment Black 7) |  |  | 10 |  | 10 |  | 10 |  | 10 |  | 10 |  |
|  | Kneading | Isopropyl alcohol | 5 | 5 | 5 | 5 | 5 | 5 | 5 | 5 | 5 | 5 | 5 | 5 |
|  | solvent | n-propyl acetate | 5 | 5 | 5 | 5 | 5 | 5 | 5 | 5 | 5 | 5 | 5 | 5 |
|  | Solvent | IPA:ethyl acetate 40:60 mixture | 35 | 35 | 35 | 35 | 35 | 35 | 35 | 35 | 35 | 35 | 35 | 35 |
|  |  | IPA:n-propyl acetate 25:75 mixture | 10 | 10 | 10 | 10 | 10 | 10 | 10 | 10 | 10 | 10 | 10 | 10 |
| Coating film | Blocking resistance |  | AA | AA | AA | AA | AA | AA | A | A | A | B | B | B |
| properties | PET laminate strength |  | AA | AA | A | AA | AA | A | AA | AA | A | AA | AA | A |
| evaluations | PET dry laminate strength |  | A | A | A | AA | AA | A | A | A | B | AA | AA | A |
| Printability | Plate clogging resistance |  | AA | AA | AA | AA | AA | AA | AA | AA | AA | AA | AA | AA |
| evaluations | Dot reproducibility |  | AA | AA | AA | AA | AA | AA | AA | AA | AA | AA | AA | AA |

TABLE 2-3

|  |  |  | Comparative Example |  |  |  |  |  |  |  |  |  |  |  |  |  |
|---|---|---|---|---|---|---|---|---|---|---|---|---|---|---|---|---|
|  |  |  | 1 | 2 | 3 | 4 | 5 | 6 | 7 | 8 | 9 | 10 | 11 | 12 | 13 | 14 |
|  | Formulation |  | H-1 | H-2 | H-3 | H-4 | H-5 | H-6 | H-7 | H-8 | H-9 | H-10 | H-11 | H-12 | H-13 | H-14 |
| Blend | Printing ink | Varnish name | F-1 | F-2 | F-3 | F-4 | F-5 | F-6 | F-7 | F-1 | F-1 | F-1 | F-1 | F-3 | F-3 | F-3 |
| composition | varnish | Amount used | 35 | 35 | 35 | 35 | 35 | 35 | 35 | 40 | 35 | 35 | 35 | 35 | 35 | 35 |
|  | Colorant | White pigment (Titanix JR-805) |  |  |  |  |  |  |  | 30 |  |  |  |  |  |  |
|  |  | Indigo blue pigment (C.I. Pigment Blue 15:3) | 10 | 10 | 10 | 10 | 10 | 10 | 10 |  |  |  |  |  |  |  |
|  |  | Yellow pigment (C.I. Pigment Yellow 14) |  |  |  |  |  |  |  |  |  | 10 |  | 10 |  |  |
|  |  | Red pigment (C.I. Pigment Red 57:1) |  |  |  |  |  |  |  |  |  | 10 |  | 10 |  |  |
|  |  | Black pigment (C.I. Pigment Black 7) |  |  |  |  |  |  |  |  |  |  | 10 |  |  | 10 |
|  | Kneading | Isopropyl alcohol | 5 | 5 | 5 | 5 | 5 | 5 | 5 | 5 | 5 | 5 | 5 | 5 | 5 | 5 |
|  | solvent | n-propyl acetate | 5 | 5 | 5 | 5 | 5 | 5 | 5 | 5 | 5 | 5 | 5 | 5 | 5 | 5 |
|  | Solvent | IPA:ethyl acetate 40:60 mixture | 35 | 35 | 35 | 35 | 35 | 35 | 35 | 20 | 35 | 35 | 35 | 35 | 35 | 35 |
|  |  | IPA:n-propyl acetate 25:75 mixture | 10 | 10 | 10 | 10 | 10 | 10 | 10 |  | 10 | 10 | 10 | 10 | 10 | 10 |
| Coating film | Blocking resistance |  | A | A | C | B | A | A | C | A | A | A | A | C | C | C |
| properties | PET laminate strength |  | A | A | B | C | A | C | A | B | A | A | B | B | B | C |
| evaluations | PET dry laminate strength |  | A | B | A | B | A | B | A | B | A | A | B | A | A | B |
| Printability | Plate clogging resistance |  | C | C | B | C | C | C | B | A | C | C | B | B | B | B |
| evaluations | Dot reproducibility |  | C | C | C | C | B | B | C | — | C | C | C | C | C | C |

The printed items prepared by applying the printing ink compositions that used the printing ink varnishes of the present invention exhibited both good coating film properties and good printability, and were able to be used without any practical problems.

The invention claimed is:

1. A printing ink composition for a laminated body, comprising a printing ink varnish comprising:
a polyurethane resin (D), obtained by reacting a urethane prepolymer, which has isocyanate groups at terminals thereof and is obtained by reacting a polymeric polyol (A) and a polyisocyanate (B), with a polyamine (C), and
a non-aromatic organic solvent,
wherein the polyamine (C) consists essentially of a polyfunctional amine (C1) and a diamine (C2),
wherein the polyfunctional amine (C1) is iminobispropylamine or 6,6-iminodihexylamine
wherein a ratio between a total number of moles of amino groups having an active hydrogen derived from the polyfunctional amine (C1) and a total number of moles of amino groups having an active hydrogen derived from the diamine (C2) is from 19:81 to 39:61, a colorant (E), and
wherein the polymeric polyol (A) comprises a polyester polyol (A1) and a polyether polyol (A2) having number-average molecular weight from 2000 to 3000, and the mass ratio between the polyester polyol (A1) and the polyether polyol (A2) is from 90:10 to 70:30.

2. The printing ink composition according to claim 1, wherein the polymeric polyol (A) comprises at least two polyester polyols (A1) having different number-average molecular weights and at least two polyether polyols (A2) having different number-average molecular weights.

3. The printing ink composition according to claim 1, wherein the polyurethane resin (D) further comprises an amine having only a single amino group with an active hydrogen as an amine-based terminator.

4. A printed item for a laminated body obtained by applying the printing ink composition for a laminated body according to claim 1 to a printing substrate.

5. A laminate formed by laminating a sealant to at least one printed surface of the printed item for a laminated body according to claim 4.

* * * * *